No. 885,311. PATENTED APR. 21, 1908.
N. A. AKERMAN.
FISH TRAP.
APPLICATION FILED JULY 27, 1907.

3 SHEETS—SHEET 2.

WITNESSES:
A. D. Gerking.
Cecil Long.

INVENTOR:
Nels A. Akerman
by T. J. Geisler
ATT'Y

THE NORRIS PETERS CO., WASHINGTON, D. C.

No. 885,311. PATENTED APR. 21, 1908.
N. A. AKERMAN.
FISH TRAP.
APPLICATION FILED JULY 27, 1907.

3 SHEETS—SHEET 3.

WITNESSES
A. D. Gerking
Cecil Long

INVENTOR:
Nils A. Akerman
by J. Geisler ATT'Y.

UNITED STATES PATENT OFFICE.

NILS AUGUST AKERMAN, OF ASTORIA, OREGON.

FISH-TRAP.

No. 885,311.  Specification of Letters Patent.  Patented April 21, 1908.

Application filed July 27, 1907. Serial No. 385,932.

*To all whom it may concern:*

Be it known that I, NILS AUGUST AKERMAN, a citizen of the United States, and a resident of Astoria, in the county of Clatsop and State of Oregon, have invented a new and useful Improvement in Fish-Traps, of which the following is a specification, reference being had to the accompanying drawings as constituting a part thereof.

This invention has for its object to incorporate certain novel features in the construction of a fish trap, whereby to attract the fish into the trap, and also to enable the custodian of the trap to look within the same to see whether or not fish have been caught, without the labor of lifting the trap for the purpose of such inspection.

Figure 1:
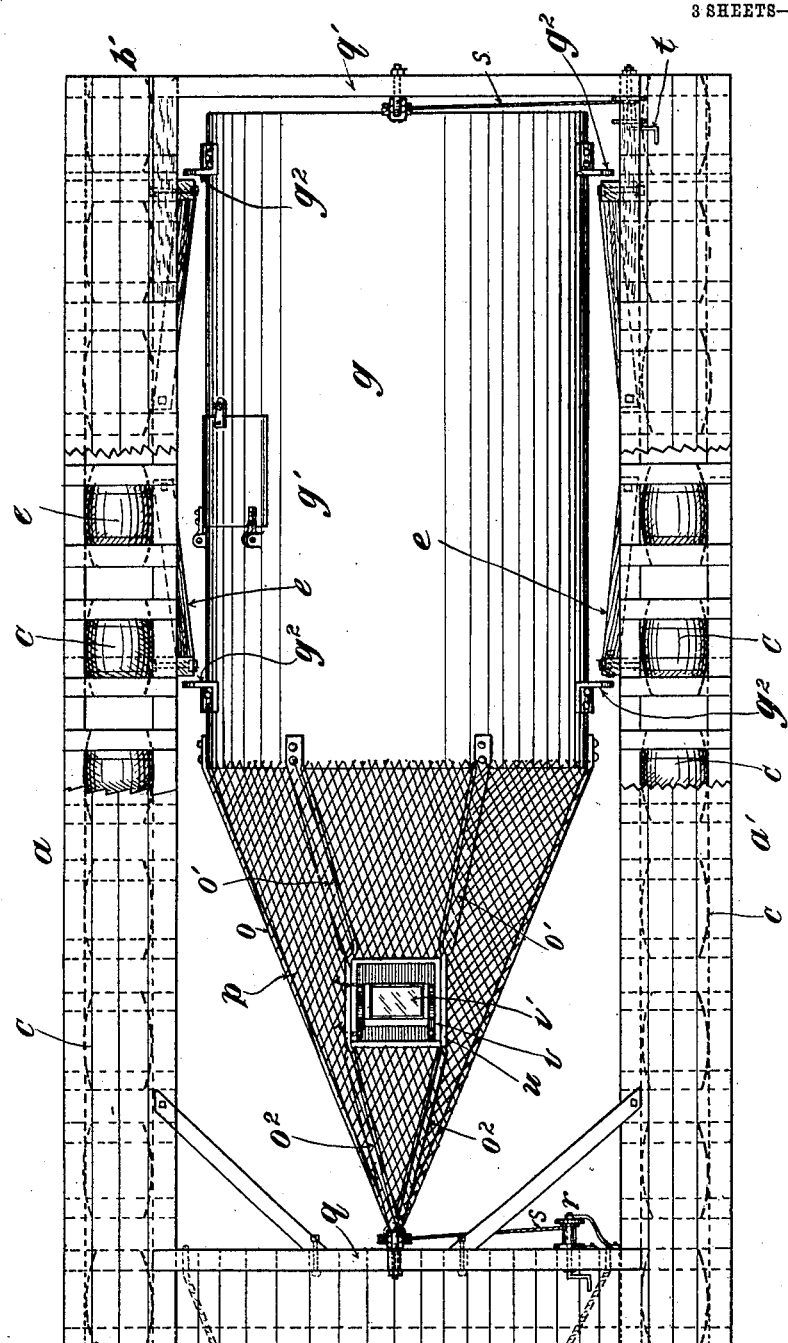
Figure 2:
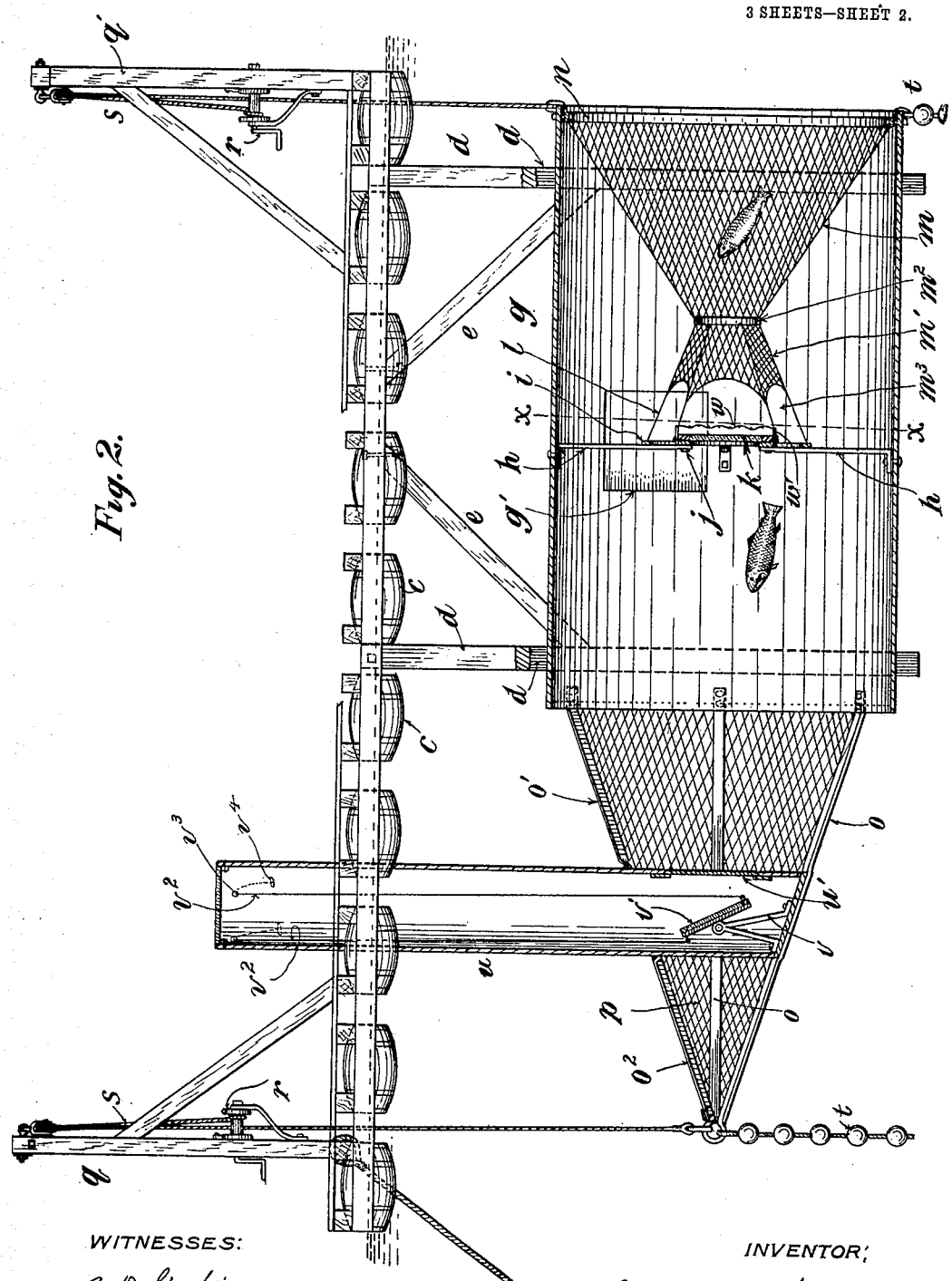
Figure 3:
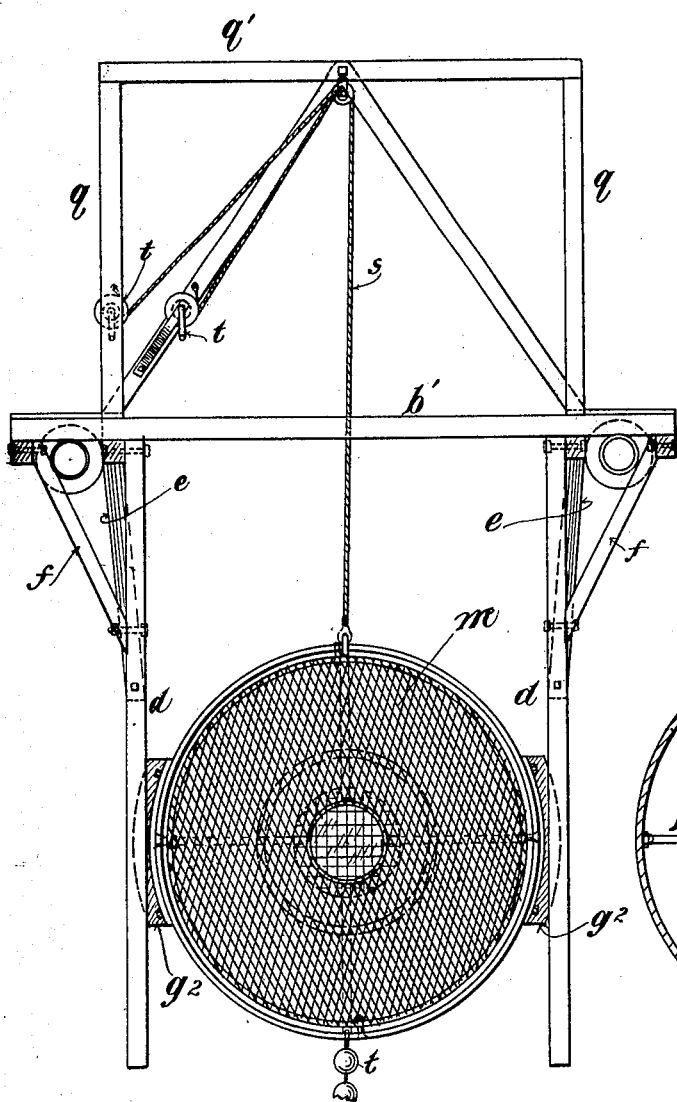
Figure 5:
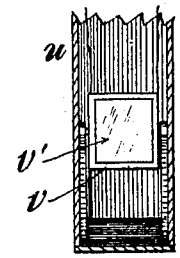
Figure 4:
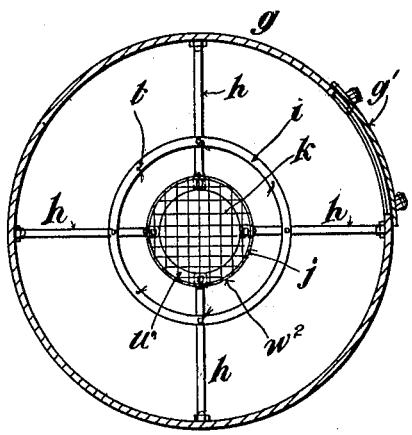

I accomplish my object by the devices and combinations illustrated in the accompanying drawings, in which, Figure 1 is a plan or top view of a float supporting a fish trap embodying my invention; Fig. 2 represents in its upper portion a side elevation of my trap, lowered into the water; and the lower portion of this figure shows a longitudinal central section of the casing of the trap, and of the contrivance which I term the inspector tube; Fig. 3 is an end elevation of the inlet end of my trap; Fig. 4 is a cross section taken on a line $x$—$x$ of Fig. 2; and Fig. 5 is a vertical cross-section of the inspector tube of my trap, showing the mirror in the bottom end thereof.

Referring now to the letters as designating the parts described: my trap may, of course, be suspended from a fixed support or a float. As shown in the drawings my trap is suspended from a raft or float, comprising side timbers $a$, $a'$ and end timbers $b$, $b'$, and the frame so built is supported by a plurality of buoys $c$. To the frame of the float are bolted dependent frame-members $d$, $d$, which serve as a means for holding the trap in place, and also serve as guides, while lifting and lowering the trap. Said frame-members $d$, hereafter called guide-members, are braced by means of braces $e$, $e$, $f$, $f$. The buoys $c$ may consist of good sized closed, empty casks or barrels, secured in place by any convenient means.

The trap consists of a cylindrical casing $g$, having affixed to its interior walls, near the center, (see Fig. 4) radial members $h$, the inner ends of which are bolted to concentric rings $i$, $j$. To the inner ring $j$ is fastened, by any convenient means, a vertical mirror $k$, (see Fig. 2); and to the outer ring $i$ are fastened the strands $l$, supporting the flaring inner portion $m'$ of the funnel-shaped net $m$, which closes the inlet end of the casing $g$, and the girth or contracted portion of which net is encompassed by a ring $m^2$. The outer end of the net $m$ is fastened to a ring $n$, secured within the entrance of the casing $g$.

The mirror $k$ is so supported as to bring its face immediately in front of the contracted inlet ($m^2$) of the net $m$, (compare Figs. 2, 3, and 4) so as to reflect a moving image of the fish, as he approaches said inlet, and thereby lure him inside of the trap.

A screen or fender of netting, $w$, fastened to a flange-rim $w'$, projecting from the ring $j$, protects the mirror $k$ from injury by blows of fish, swimming against the mirror, in seeking ingress into the body of the trap. The fish finding the reflected passage-way through the mirror blocked by the net $w$, and the space between the rings $j$, $i$, being narrow, it will enter the body of the trap through the spaces $m^3$ between the strands $l$. The fish can readily pass from the outer end to the inner end of the trap between the radial arms $h$.

Once having gotten into the body of the trap, the fish cannot readily return; for the mirror $k$ would impose a dark deterrent object in front of the contracted opening of the net $m$; and there would be nothing to aid the fish to retrace its way between the net strands $l$, and so escape.

The trap-casing $g$ is provided with a hinged trap-door $g'$ to give access to the interior. To the inner end of the casing $g$ are affixed bars of angle-iron $o$, $o'$ constituting a tapering or cone-shaped frame, which is inclosed by a netting $p$. To the exterior at both ends of the casing $g$ are affixed curved angle-iron segments $g^2$, so positioned as to slide against the guide members $d$, and hold the trap against longitudinal movement or displacement, while being lifted and lowered.

On the fore and aft ends of the float are affixed upright frames $q$, $q'$, respectively provided with winches, on the drums of which wind the ends of ropes $s$, fastened to the ends of the trap, and thus providing means for lifting and lowering the trap.

To the fore and aft ends of the trap are further affixed weights $t$, to cause the trap to sink in the water when lowered, and also to steady the same. The raft is moored or anchored in place as convenient.

The frame-members $o'$, $o^2$ of the projecting cone-shaped frame, affixed to the fore end of the casing $g$, are so arranged as to support a vertical casing $u$, being the inspector tube. The latter is closed at the bottom end to exclude the water and has near the bottom a window spring covered with a pane of glass $u'$, and also has a support $v$, on which is pivoted a mirror $v'$, controllable from the float by working cords $v^2$, the upper ends of which extend through openings $v^3$ in the upper end of the inspector tube, and are secured to retaining bars $v^4$. The purpose of my inspector tube is to enable the custodian of the trap to so manipulate the mirror $v'$ as to look into the fish trap and see whether the same has caught sufficient fish to make it worth while to lift the trap; and thus save the labor of lifting the trap unnecessarily.

To apply my described trap to a fixed support instead of a float is so simple a matter as not to require description.

I claim:

1. A fish-trap comprising a support, a tubular casing horizontally suspended therefrom, means by which to raise and lower the casing, a net-inclosed extension projecting from the inner end of the casing, a net-closure at the inlet end of the casing, said net having a central opening constituting the entrance into the body of the trap, a mirror supported transversely in front of said central opening, a net fender or screen arranged in front of said mirror to protect the same from injury, an inspector-tube extending from the support down into said net-inclosed extension, the bottom end of the inspector-tube being closed, a glass-covered window in the lower end of the inspector-tube facing the inner end of the casing, a mirror pivotally supported within the bottom end of said inspector-tube in line with the window thereof, and means operable from the support to adjust the mirror as desired.

2. In a fish-trap, the combination of a float and a tubular horizontally supported trap-body suspended therefrom, an inspector-tube extending from the support down in front of the inner end of the trap-body, the bottom end of said inspector-tube being closed, a glass-covered window in the lower end of the inspector-tube facing the inner end of the trap, a mirror pivotally supported within said inspector-tube in line with the window thereof, and means operable from the support to adjust the mirror as desired.

3. In a fish-trap, the combination of a float and a tubular horizontally supported trap-body suspended therefrom, an inspector-tube extending from the support down in front of the inner end of the trap-body, the bottom end of said inspector-tube being closed, a glass-covered window in the lower end of the inspector-tube facing the inner end of the trap, a mirror pivotally supported within said inspector-tube in line with the window thereof, cords fastened to the upper and lower ends of the mirror apertures therefor provided in the upper end of said inspector-tube, and retaining bars secured to the ends of said cords.

4. In a fish-trap, the combination of a horizontal tubular trap-body, transverse radial arms affixed interiorly thereof, a funnel-shaped net fastened to the inlet end of said trap-body, and having a small opening constituting the entrance into the trap, a mirror supported to face the entrance.

5. In a fish-trap, the combination of a horizontal tubular trap-body, transverse radial arms affixed interiorly thereof, a funnel-shaped net fastened to the inlet end of said trap-body, and having a small opening constituting the entrance into the trap, flaring annular net portions encompassing and extending inward from said opening, strands connecting said inner flaring net portion to said radial arms leaving spaces between the strands, a mirror supported to face the entrance.

6. In a fish-trap, the combination of a horizontal tubular trap-body, transverse radial arms affixed interiorly thereof, a funnel-shaped net fastened to the inlet end of said trap-body, and having a small opening constituting the entrance into the trap, flaring annular net portions encompassing and extending inward from said opening, strands connecting said inner flaring net portion to said radial arms leaving spaces between the strands, a mirror supported to face the entrance, a fender arranged in front of the mirror to protect the same from injury.

7. In a fish-trap, the combination of a horizontally supported trap-body, radial arms affixed interiorly thereof, concentric rings supported by said radial arms leaving a large space between the outer of said rings and the wall of the body, a funnel-shaped net fastened to and constituting a closure for the inlet end of the body and having a contracted central opening, a girth inclosing such contracted opening, a flaring annular net connected to the girth encompassing the contracted opening and extending inward therefrom, strands connecting said inner flaring net to said radial arms leaving spaces between the strands, a mirror supported by the radial arms in front of said contracted opening, a fender arranged in front of the mirror to protect the same from injury.

8. In a fish-trap, the combination of a horizontally supported trap-body, radial arms affixed interiorly thereof, concentric rings supported by said radial arms leaving a large space between the outer of said rings and the wall of the body, a funnel-shaped net fastened to and constituting a closure for the inlet end of the body and having a contracted central opening, a girth inclosing such contracted opening, a flaring annular net connected to the girth encompassing the contracted opening and extending inward therefrom, strands connecting said inner flaring net to said radial arms leaving spaces between the strands, a mirror supported by the radial arms in front of said contracted opening, a fender arranged in front of the mirror to protect the same from injury, a trap-door arranged to give access to the body of the trap.

9. A fish-trap comprising a float, a guide frame supported thereby, a tubular horizontal trap-body between the guide-members, means on said trap-body engaging with said guide-frame and arranged to hold the former against longitudinal movement, an upright frame supported by the float, a winch and cables connected thereto supporting the trap-body, a vertical inspector-tube at the inner end of the trap-body extending above the float, the bottom end of such tube being closed, a glass-covered window near the bottom end of the inspector-tube, a mirror pivoted within the tube in line with the window, and means operable from the float to adjust the mirror as desired.

10. A fish-trap comprising a float, a guide frame supported thereby, a tubular horizontal trap-body between the guide members, means on said trap-body engaging with said guide-frame and arranged to hold the former against longitudinal movement, an upright frame supported by the float, winches on the last mentioned frame and cables connected thereto supporting the trap-body, radial arms affixed interiorly the latter, concentric rings supported by said radial arms, leaving a large space between the outer of said rings and the wall of the body, a funnel-shaped net fastened to and constituting a closure for the inlet-end of the trap-body, and having a contracted central opening, a girth inclosing such contracted opening, a flaring annular net, connected to the girth, encompassing the contracted opening and extending inward therefrom, strands connecting said inner flaring net to said radial arms leaving spaces between the strands, a mirror supported by the radial arms in front of said contracted opening, a fender arranged in front of the mirror to protect the same from injury, a net-inclosed extension projecting from the inner end of the trap-body, an inspector-tube extending down from the float into said net-inclosed extension, the bottom end of the inspector-tube being closed, a glass-covered window in the lower end of the inspector-tube facing the inner end of the trap-body, a mirror pivotally supported within the bottom end of said inspector-tube in line with the window thereof, and means operable from the float to adjust the mirror as desired.

NILS AUGUST AKERMAN.

Witnesses:
JOHN WATERHOUSE,
A. M. SMITH.